(12) United States Patent
Zillmer et al.

(10) Patent No.: US 12,525,371 B2
(45) Date of Patent: Jan. 13, 2026

(54) POWER GENERATION DEVICES, ASSOCIATED COMPONENTS, AND METHODS

(71) Applicant: Battelle Energy Alliance, LLC, Idaho Falls, ID (US)

(72) Inventors: Andrew J. Zillmer, Idaho Falls, ID (US); Michael A. Reichenberger, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 301 days.

(21) Appl. No.: 18/183,737

(22) Filed: Mar. 14, 2023

(65) Prior Publication Data

US 2023/0298777 A1  Sep. 21, 2023

Related U.S. Application Data

(60) Provisional application No. 63/269,492, filed on Mar. 17, 2022.

(51) Int. Cl.
*G21H 1/10* (2006.01)
*G21K 5/02* (2006.01)

(52) U.S. Cl.
CPC ............... *G21H 1/106* (2013.01); *G21K 5/02* (2013.01)

(58) Field of Classification Search
CPC ................................. G21H 1/106; G21K 5/02
USPC ....................................................... 310/304
See application file for complete search history.

(56) References Cited

U.S. PATENT DOCUMENTS

| | | | |
|---|---|---|---|
| 4,008,399 A | 2/1977 | Brown | |
| 4,197,463 A | 4/1980 | Todt et al. | |
| 5,122,332 A | 6/1992 | Russell | |
| 5,149,494 A * | 9/1992 | Russell | G21H 1/00 250/515.1 |
| 5,280,213 A * | 1/1994 | Day | G21H 1/06 310/305 |
| 5,861,701 A * | 1/1999 | Young | G21H 1/04 310/305 |
| 6,700,298 B1 * | 3/2004 | Snyder | G21H 1/00 310/305 |
| 6,946,596 B2 * | 9/2005 | Kucherov | H10N 10/00 136/238 |
| 7,122,735 B2 * | 10/2006 | Zuppero | H10D 62/8164 310/311 |
| 9,391,218 B2 | 7/2016 | Gaspari | |
| 9,779,845 B2 | 10/2017 | Noyes | |
| 10,269,463 B2 | 4/2019 | Choi et al. | |
| 10,978,215 B2 | 4/2021 | Cabauy et al. | |

(Continued)

FOREIGN PATENT DOCUMENTS

GB  0845701 A  8/1960
GB  1235090 A  6/1971

*Primary Examiner* — Rashad H Johnson
(74) *Attorney, Agent, or Firm* — TraskBritt

(57) ABSTRACT

A power generation device may include a radiation source, an emitter, and a collector. The emitter may be formed adjacent to the radiation source. The emitter may include a high-density material. The collector may be adjacent to the radiation source and include a low-density material. The emitter is between the radiation source and the collector. An insulator may be positioned between the emitter and the collector. An emitter of a nuclear battery and a method of forming an emitter of a nuclear battery are also disclosed.

19 Claims, 7 Drawing Sheets

(56) References Cited

U.S. PATENT DOCUMENTS

| | | |
|---|---|---|
| 10,985,676 B2 | 4/2021 | Choi et al. |
| 11,037,687 B2 | 6/2021 | Choi et al. |
| 11,721,451 B2 * | 8/2023 | Choi .................. G21H 1/00 310/304 |
| 2018/0350482 A1 | 12/2018 | Ryan |
| 2019/0392961 A1 * | 12/2019 | Choi .................. G21H 1/04 |
| 2020/0373035 A1 * | 11/2020 | Choi .................. G21H 1/04 |
| 2022/0328209 A1 * | 10/2022 | Moses ................ G21H 1/103 |
| 2023/0298777 A1 * | 9/2023 | Zillmer ............... G21K 5/02 310/304 |

* cited by examiner

POWER GENERATION DEVICES, ASSOCIATED COMPONENTS, AND METHODS

CROSS-REFERENCE TO RELATED APPLICATION

This application claims the benefit under 35 U.S.C. § 119(e) of U.S. Provisional Patent Application Ser. No. 63/269,492, filed Mar. 17, 2022, the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

TECHNICAL FIELD

Embodiments of the present disclosure generally relate to power generation devices. In particular, embodiments of the present disclosure relate to nuclear power generation devices and associated components, systems, and methods.

BACKGROUND

A power generation device, such as nuclear power generation devices, may capture electrical energy from moving electrons. In some cases, the movement of the electrons is created by an electrical field, such as a magnetic field. In other cases, the movement of the electrons may be caused by moving the electrons from one material to another due to electrical potential between the two materials, such as a battery moving electrons from a cathode to an anode. The movement of the electrons creates an electrical current which can be used to power electrical components or to generate power for storage, such as in batteries.

Conventional nuclear power generation systems contain and control nuclear chain reactions that produce heat through a physical process called fission, where a particle (e.g., a neutron) is fired at an atom, which then splits into two smaller atoms and some additional neutrons. Some of the released neutrons then collide with other atoms, causing them to also fission and release more neutrons. A nuclear reactor achieves criticality (commonly referred to in the art as going critical) when each fission event releases a sufficient number of neutrons to sustain an ongoing series of reactions. Nuclear reactors may include a fluid, such as a cooling fluid, flowing through the nuclear reactor configured to transfer heat from the reactor chamber to a heat collection region, where the heat may be removed and/or converted into electricity, such as by turning a generator creating a magnetic field to induce an electrical current.

SUMMARY

Embodiments of the disclosure include a power generation device. The device includes a radiation source. The device further includes an emitter adjacent to the radiation source. The emitter includes a high-density material. The device also includes a collector adjacent to the emitter. The collector includes a low-density material, the emitter positioned between the radiation source and the collector. The device further includes an insulator positioned between the emitter and the collector.

Other embodiments of the disclosure include an emitter of a nuclear battery. The emitter includes a high-density material having an inner surface and an outer surface. At least one of the inner surface and the outer surface of the emitter include a roughened surface including multiple peaks configured to create high-energy areas.

Other embodiments of the disclosure include a method of forming an emitter of a nuclear battery. The method includes forming a ring from a high-density material through an additive manufacturing process. The method further includes forming multiple peaks extending from a surface of the ring.

BRIEF DESCRIPTION OF THE DRAWINGS

While the specification concludes with claims particularly pointing out and distinctly claiming embodiments of the present disclosure, the advantages of embodiments of the disclosure may be more readily ascertained from the following description of embodiments of the disclosure when read in conjunction with the accompanying drawings in which:

DETAILED DESCRIPTION

Figure 1:
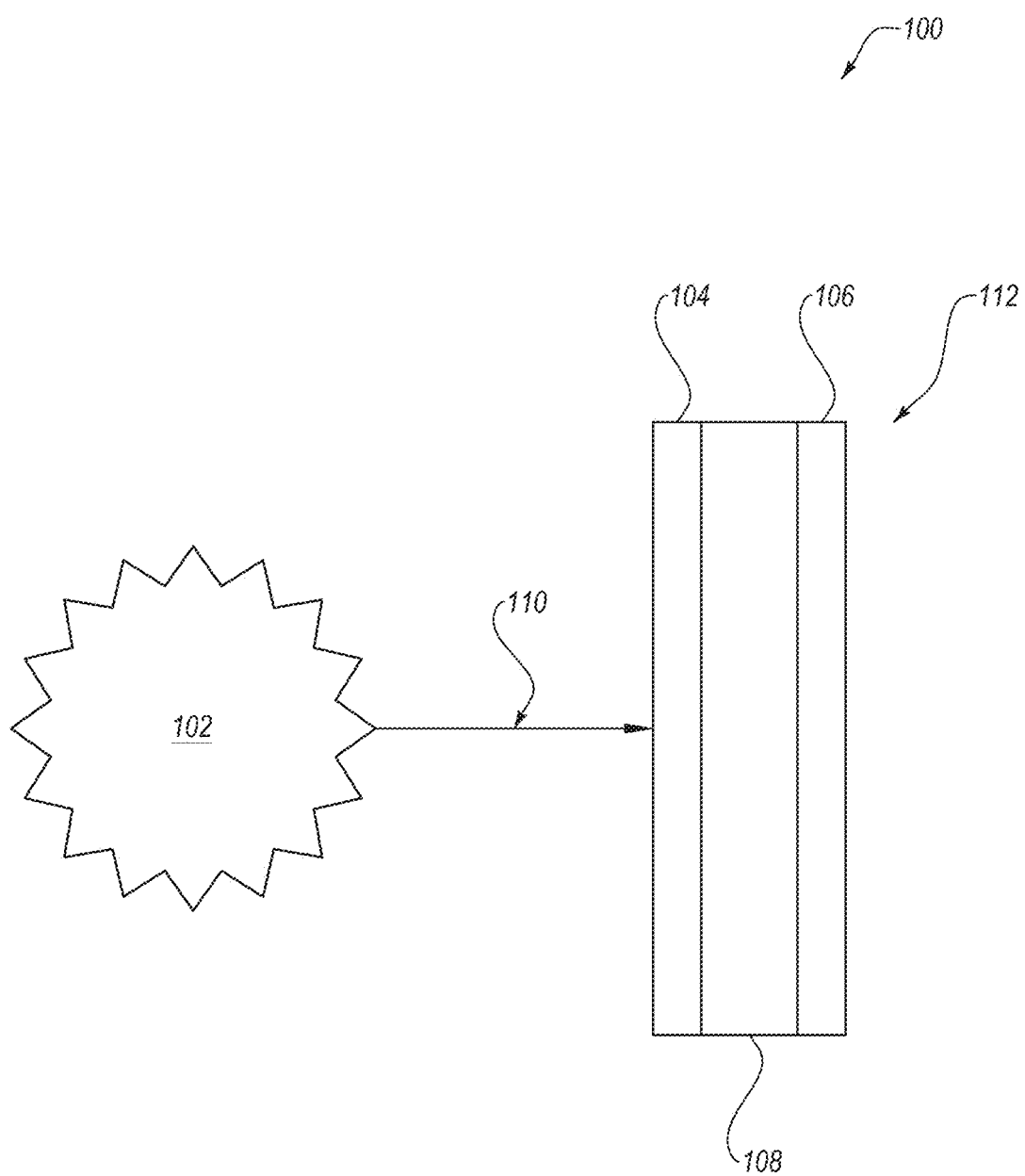
FIG. 1 illustrates a power generation system in accordance with an embodiment of the disclosure.

The following description provides specific details, such as material compositions, shapes, and sizes, in order to provide a thorough description of embodiments of the disclosure. However, a person of ordinary skill in the art would understand that the embodiments of the disclosure may be practiced without employing these specific details. Indeed, the embodiments of the disclosure may be practiced in conjunction with conventional techniques employed in the industry.

Drawings presented herein are for illustrative purposes only and are not meant to be actual views of any particular material, component, structure, device, or system. Variations from the shapes depicted in the drawings as a result, for example, of manufacturing techniques and/or tolerances, are to be expected. Thus, embodiments described herein are not to be construed as being limited to the particular shapes or regions as illustrated, but include deviations in shapes that result, for example, from manufacturing. For example, a region illustrated or described as box-shaped may have rough and/or nonlinear features, and a region illustrated or described as round may include some rough and/or linear features. Moreover, sharp angles that are illustrated may be rounded, and vice versa. Thus, the regions illustrated in the figures are schematic in nature, and their shapes are not intended to illustrate the precise shape of a region and do not limit the scope of the present claims. The drawings are not necessarily to scale. Additionally, elements common between figures may retain the same numerical designation.

As used herein, the terms "configured" and "configuration" refers to a size, a shape, a material composition, a material distribution, orientation, and arrangement of at least one feature (e.g., one or more of at least one structure, at least one material, at least one region, at least one device) facilitating use of the at least one feature in a pre-determined way.

As used herein, the term "substantially" in reference to a given parameter means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0 percent met, at least 95.0 percent met, at least 99.0 percent met, at least 99.9 percent met, or even 100.0 percent met.

As used herein, "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, relational terms, such as "beneath," "below," "lower," "bottom," "above," "upper," "top," "front," "rear," "left," "right," and the like, may be used for ease of description to describe one element's or feature's relationship to another element(s) or feature(s) as illustrated in the drawings. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the singular forms "a," "an," and "the" are intended to include the plural forms as well, unless the context clearly indicates otherwise.

As used herein, the term "and/or" means and includes any and all combinations of one or more of the associated listed items.

As used herein, the terms "vertical," "longitudinal," "horizontal," and "lateral" are in reference to a major plane of a structure and are not necessarily defined by earth's gravitational field. A "horizontal" or "lateral" direction is a direction that is substantially parallel to the major plane of the structure, while a "vertical" or "longitudinal" direction is a direction that is substantially perpendicular to the major plane of the structure. The major plane of the structure is defined by a surface of the structure having a relatively large area compared to other surfaces of the structure.

As used herein, the term "dielectric material" includes an insulator that can be polarized in an electric field.

Conventional nuclear power generation systems contain and control nuclear chain reactions that produce heat. Nuclear reactors may include a fluid, such as a cooling fluid, flowing through the nuclear reactor configured to transfer heat from the reactor chamber to a heat collection region, where the heat may be removed and/or converted into electricity by turning a generator creating a magnetic field to induce an electrical current. Conventional nuclear power generation systems are complex, expensive, and large, which limits their applications. Furthermore, the fuel used in the nuclear power generation system continues to emit radiation after it is removed from the reactor chamber, which requires special consideration when disposing of the used fuel. A power generation system utilizing nuclear fuel without the complex moving parts and multiple intermediary systems may reduce the complexity, expense, and size requirements associated with nuclear power generation. For example, a power generation system according to embodiments of the disclosure may generate power by capturing electron motion between different materials that is driven by a radiation source, such as used nuclear fuel. This type of power generation system may be referred to as a nuclear battery due to the operational similarities to a chemical battery.

FIG. 1 illustrates a schematic diagram of a power generation system 100. The power generation system 100 may include a radiation source 102 emitting radiation 110 and a thermionic cell 112. The radiation 110 may take the form of photons, gamma rays, X-rays, beta particles, etc. The radiation 110 may impinge on an emitter 104 of the thermionic cell 112. The impinging radiation 110 may dislodge electrons from the emitter 104, such as through pair production, Compton scattering, or photoelectric absorption. Pair production is the creation of a subatomic particle and its antiparticle from a neutral boson. Pair production may refer to the radiation 110 dislodging an electron-positron pair. Compton scattering is a physical phenomenon where an outer shell electron absorbs a portion of the energy from the photon and is dislodged or liberated from the atom as a Compton electron. The dislodged electrons may pass through an insulator 108 before being captured by a collector 106 of the thermionic cell 112. The movement of the dislodged electrons from the emitter 104 to the collector 106 may create a current in the collector 106, which may then be harnessed and used as electrical power. In the photoelectric process, an electron coupled and dislodged by a high-energy photon or by an energetic beta particle gains a portion of photon energy or beta particle energy. In such a case, the portion of energy gained by a dislodged electron is substantially high, such as up to several hundreds of keV. This electron is energetic and may have an increased collision probability with the shell electrons of neighboring atoms.

The power generation system 100 uses a heavy collection of dislodged electrons, such as 103-105 $C/cm^3$, for power generation through thermionic processes. The dislodged electrons are highly energetic. A thermionic process can maximize the dislodged electrons transmission across the insulator 108 in the power generation system 100 since this large number of free electrons obtained through radiation driven quantum transition is directly pushed off and across the insulator 108.

If the radiation isotope materials used as the radiation source 102 and emitter materials are too thick, the scattering and absorption of emitted gamma-rays and high-energy beta particles within the isotope and emitter materials become dominant and spread the original intensity of emission spectra into the emissions of lower energetic electrons (Compton electrons and Auger electrons), X-ray fluorescence, and increased thermal loading. Adopting distributed thin multi-layer radioisotope sources may reduce thermal loading due to multiple layers scattering high-energy photons and/or energetic beta particles in higher order interactions.

The internal thermal loading by scattering and absorption becomes more significant when the decay process of the radioisotope material creates very high-energy photons and/or high-energy beta particles and the body mass increases. Such a photon and/or a beta particle initially interacts with the intra-band electrons and nucleus of atom to generate a number of energetic electrons, gamma-rays remainder, and X-ray fluorescence by energy and momentum splitting. These energetic electrons, gamma-rays remainder, and X-ray fluorescence from the primary interaction, referred to herein as incident radiation, undergo a secondary mode of interaction with neighboring atoms to generate additional dislodged electrons, but at the same time may increase thermal loading if a material scattering thickness is too thick.

The production of energetic electrons, gamma-rays remainder, and X-ray fluorescence can be described by one or more of the coupling processes of photoelectric processes, photonuclear processes, Compton scattering, and electron/positron pair production. A huge number of electrons in the intra-band of atom can be dislodged through a bound-to-free transition when coupled with either high-energy photons or high-energy beta particles or both together.

As described above, the photoelectric process may include an electron coupled and dislodged by a high-energy photon or by an energetic beta particle that gains a portion of photon energy or beta particle energy. The portion of energy gained by a dislodged electron may be up to several hundreds of keV. This electron may have an increased collision probability with the shell electrons of neighboring atoms. The dislodged electron from an inner-shell structure of an atom almost instantaneously induces the bound-to-free transition of another neighboring electron to adjust for the inner-shell vacancy of the atom. This phenomenon is known as the Auger effect. In this process, the adjustment for the inner-shell vacancy of an atom also emanates a few keV level X-rays which is generally known as X-ray fluorescence or Bremsstrahlung. An energized beta particle may have a similar effect on an atom as that of a high-energy photon. A beta particle with MeV level energy has the ability to shake up the nucleus of an atom through a collision. An emission of gamma-rays generally results from the collision. The gamma rays may then generate other similar interactions with neighboring atoms.

In the photonuclear process, high-energy photons may directly couple with a nucleus. In such a coupling case, the nucleus may undergo a level reordering process under an unstable resonant mode if the photon energy is lower than the binding energy of the nucleus. Unstable resonant modes of a nucleus can generate a variation in centroid energy levels of nuclei that affects the stability of valence shell electrons. In some cases, the level reordering process may cause a majority of photon energy to create a pair production near a nucleus. The photon energy level of the interaction must be above a certain threshold to create the pair which is at least the total rest mass energy of the two particles. The rest mass energies of an electron and a positron are 1.022 MeV. Therefore, the minimum photon energy level to create an electron-positron pair is 1.022 MeV. Any photon energy level higher than 1.022 MeV can increase the rate of pair production. When pair production occurs, the nucleus undergoes a mode change with a recoiling process. Accordingly, the pair production process of electron/positron generates gamma-rays at 1.022 MeV.

Compton scattering is a physical phenomenon that describes the scattering of a photon with a charged particle, similar to an electron. When a charged particle is coupled with high-energy photon, a charged particle gains energy from the incident photon while the photon energy, after scattering, is reduced by the same amount of energy gained by a charged particle. When an electron is affected by Compton scattering with gamma-rays, the energy level gained by the electron is substantial and accelerates the electron with the kinetic energy at a keV level. The remaining energy is still carried by the photon.

The emitter 104 may be formed from a high-density material, such as tungsten, tantalum, uranium, rhenium, gold, etc., and/or alloys thereof. The high-density materials may interact with a greater number of photons than lower density materials, which may result in a higher number of dislodged electrons and generated gamma rays and X-rays through the processes described above. The collector 106 may be formed from low-density materials, such as copper, titanium, aluminum, etc., and alloys thereof. The low-density materials may be less susceptible to the radiation energy and may collect the dislodged electrons to form a charged surface, where a flow of electrons may be induced to generate electrical power. The transfer of electrons from the high-density emitter 104 to the low-density collector 106 may increase as a difference between the densities of the emitter 104 and the collector 106 increase. Thus, a greater difference between the density of the high-density material of the emitter 104 and the density of the low-density material of the collector 106 may result in a greater transfer of dislodged electrons from the emitter 104 to the collector 106. The insulator 108 may be formed from an electrically insulating material, such as a ceramic material or a high-temperature polymer material. In some embodiments, the insulator 108 may be a vacuum gap between the emitter 104 and the collector 106. The power generation system 100 may be referred to as a nuclear battery or a Nuclear Thermionic Cell (NTC) system.

Figure 2:
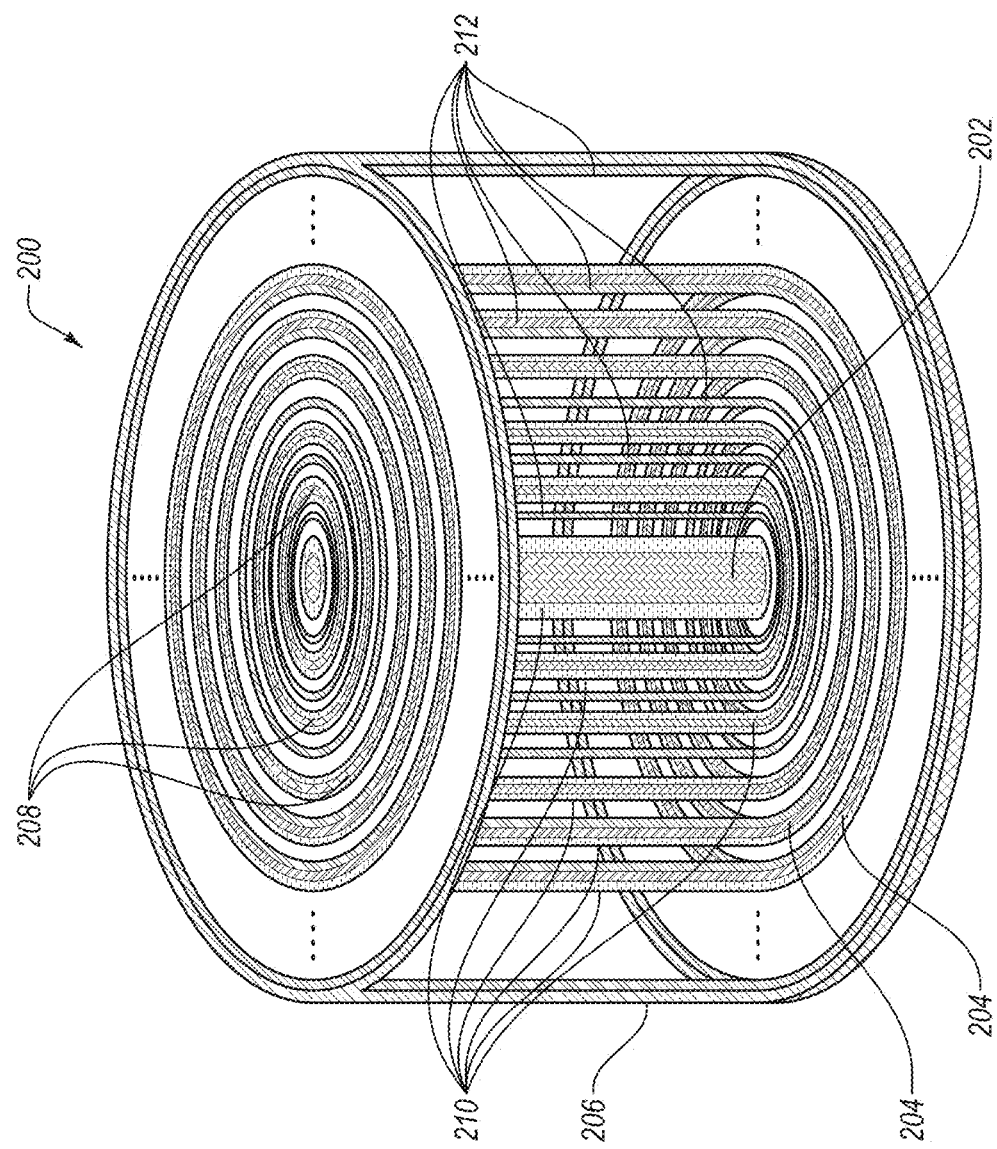
FIG. 2 illustrates a power generation system in accordance with an embodiment of the disclosure.

FIG. 2 illustrates a multi-layered power generation system 200. The power generation system 200 may include a radioisotope core 202 surrounded by thin radioisotope layers 208. The thin radioisotope layer 208 may be optional, such that the power generation system 200 may be formed including the radioisotope core 202 and no additional radioisotope layers 208 surrounding the radioisotope core 202. In some implementations, the radioisotope or fuel in the radioisotope core 202 and/or the radioisotope layers 208 may be cobalt-60, sodium-22, cesium-137, nuclear waste, recycled nuclear waste, or other suitable nuclear fuel. The radioisotope core 202 and radioisotope layers 208 may include emitters 210 and collectors 212. The walls and the top and bottom caps of the power generation system 200 may have radiation shielding 206 encapsulating the power generation system 200. The radioisotope core 202 and radioisotope layers 208 and emitters 210 of the power generation system 200 may have a tendency to scatter and absorb their own emitted radiation and/or beta particles.

As illustrated in FIG. 2, the radioisotope layers 208, emitters 210, and collectors 212 may be formed as concentric rings substantially surrounding the radioisotope core 202. For example, the power generation system 200 may include the radioisotope core 202 and repeating rings of an insulator 204 (e.g., a dielectric material), a collector 212, an emitter 210, an insulator 204, a collector 212, an emitter 210, etc., surrounding the radioisotope core 202. The insulator 204 may function as a barrier material. Thus, substantially all of the radiation leaving the radioisotope core 202 and the radioisotope layers 208 may impinge on the emitters 210 surrounding the radioisotope core 202 and the radioisotope layers 208. The concentric rings may have any number of shapes, such as circular rings, oval rings, square rings, triangular rings, rectangular rings, polygonal rings, etc. In some embodiments, the radioisotope layers 208, emitters 210, and collectors 212 may be formed as concentric three-dimensional shapes, such as cubes, rectangular prisms, spheres, capsules, spherocylinders, ellipsoids, etc.

Figure 3:
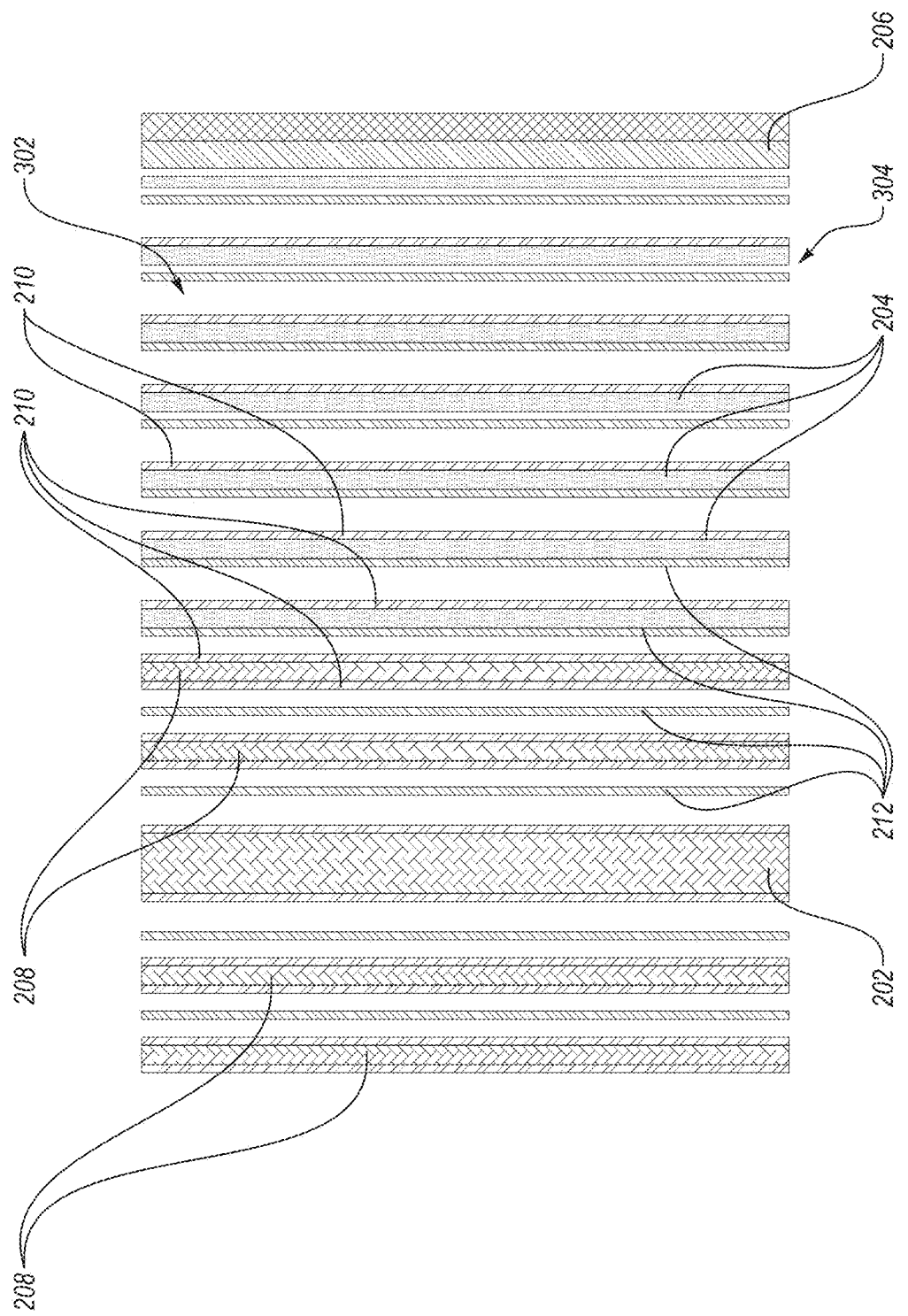
FIG. 3 illustrates a cross-sectional view of the power generation system of FIG. 2.

FIG. 3 illustrates a cross-sectional view of the power generation system 200 illustrating the arrangement of the different layers of the concentric rings. The radioisotope core 202 may be bordered by an emitter 210. Similarly, each of the radioisotope layers 208 may have emitters 210 formed on each wall of the radioisotope layers 208. Thus, the radiation leaving each of the radioisotope core 202 and the radioisotope layers 208 first passes through an emitter 210. Each of the emitters 210 may absorb at least some of the radiation leaving the radioisotope core 202 and the radioisotope layers 208, which may result in dislodged electrons. There may be a collector 212 positioned between each of the radioisotope layers 208 and between the radioisotope core 202 and the innermost radioisotope layer 208. The collectors 212 may be configured to receive the dislodged electrons as described above. An insulating layer may be positioned between each of the collectors 212 and the adjacent emitters 210. For example, in the embodiments illustrated in FIG. 3 a vacuum gap 302 is positioned between each of the collectors 212 and the adjacent emitters 210. The vacuum gap 302 acts as an insulator. After the outermost radioisotope layer 208, there may be another vacuum gap 302 separating the associated emitter 210 from the next collector 212. The collector 212 may then be joined to an insulator 204 and an emitter 210. Thus, the radiation that passes beyond the outermost radioisotope layer 208 may begin passing through additional emitters 210, where the energy of the radiation may be absorbed and additional electrons may be dislodged. The radiation may include radiation discharged from the radioisotope core 202 and the radioisotope layers 208 as well as additional radiation (e.g., gamma rays, X-rays, beta particles, photons, etc.) that may be released by the coupling processes described above.

Each layer 304 outside the outermost radioisotope layer 208 may include a collector 212 facing inward (e.g., toward the radioisotope core 202) and an emitter 210 facing outward (e.g., away from the radioisotope core 202) with an insulator 204 positioned between the collector 212 and the emitter 210. Each of the layers 304 may be separated from an adjacent layer 304 by a vacuum gap 302. Thus, the emitter 210 of an inner layer 304 may face the collector 212 of the next layer 304 with a vacuum gap 302 between the emitter 210 of the inner layer 304 and the collector 212 of the outer layer 304. The electrons dislodged from the emitter 210 of the layer 304 may then pass across the vacuum gap 302 to be received by the adjacent collector 212.

A large number of electrons dislodged from emitter 210 are emitted from the surfaces of emitter 210 and cross over the vacuum gap 302 and arrive at the collector 212. By the direct impingement of high-energy photons, such as a gamma-ray transmitted through the emitter, X-ray fluorescence and the residue gamma-ray as a remainder of Compton scattering, the collector 212 may also have inner-shell electrons that are dislodged from the collector material. However, the number of energetic electrons arriving from emitters 210 at collectors 212 overwhelms the number of dislodged electrons from collector 212. By forming a closed circuit between the emitter and the collector, a power circuit may then harness these electrons from the collector 212 to a load.

Increasing the number of electrons dislodged from the emitter 210 may increase the power generated by the power generation system 200. Increasing the power generated by the power generation system 200 may increase an efficiency of the power generation system 200. Furthermore, increasing the power generated by each layer 304 of the power generation system 200 may enable the number of layers 304 in the power generation system 200 to be reduced, which may reduce the size and/or weight of the power generation system 200.

The emitter 210 may include areas on the surfaces that are rough including peaks, valleys, ridges, etc., which may result in an increased surface area. The peaks and ridges on the surface may have a higher electric field than the surrounding areas. Creating areas on the emitter 210 having a higher electric field may increase the electrons that are dislodged from the emitter 210. Thus, forming the emitter 210 from a material having a greater surface roughness may increase the electrons that are dislodged therefrom. In some embodiments, the surface irregularities, such as peaks, valleys, and ridges, may be created through plasma spraying of a metal onto an emission surface of the emitter 210. In other cases, the emitting surfaces of the emitter 210 may be subjected to a low-density plasma to create the surface irregularities.

Accordingly, embodiments of the disclosure may include an emitter of a nuclear battery including an annular high-density material having an inner surface and an outer surface. The outer surface may include a roughened surface including multiple peaks configured to create high-energy areas.

Figure 4:
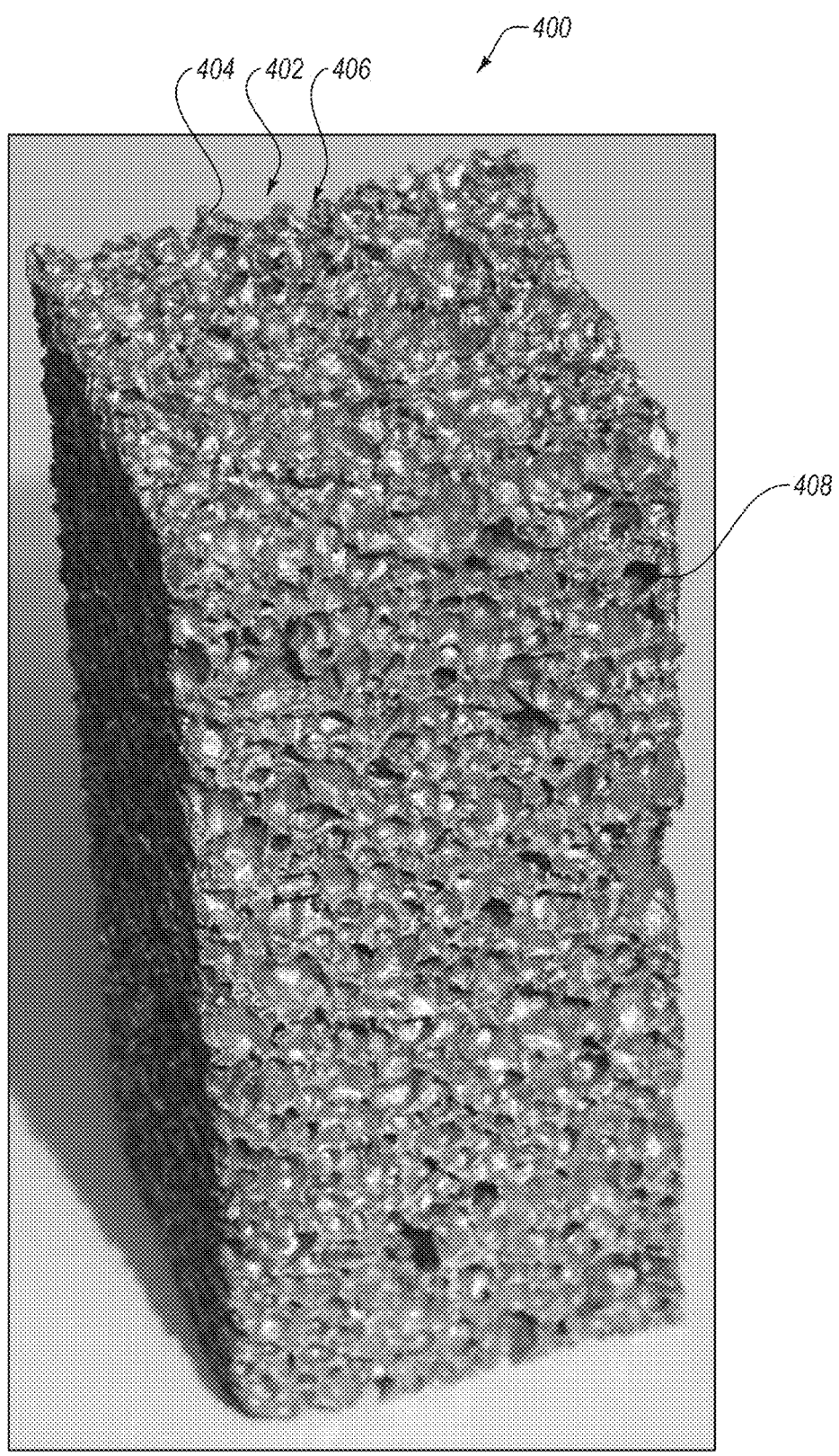
FIG. 4 illustrates a metal foam material in accordance with an embodiment of the disclosure.

In some embodiments, the emitter 210 may be formed from a metal foam material. FIG. 4 illustrates an enlarged view of a metal foam material 400. As illustrated, the surfaces 402 of the metal foam material 400 are rough surfaces including peaks 404 and recesses 406 throughout the surfaces 402. As described above, the peaks 404 of the surface 402 may create areas having a higher electric field. The metal foam material 400 also includes voids 408 throughout the metal foam material 400. The voids 408 may be bordered by additional ridges and other areas having a higher electric field. Thus, forming an emitter 210 from a metal foam material 400 may result in significant increases in dislodged electrons, which may result in an increased power output. The metal foam material 400 may be formed from a high-density metal, such as tungsten, tantalum, uranium, rhenium, gold, etc., and/or alloys thereof.

In some embodiments, the emitter 210 may be formed through an additive manufacturing process, such as 3-D printing. For example, the additive manufacturing process may form a foam like structure that is substantially uniform, such as a honeycomb structure or other similar structure defining voids, peaks and recesses throughout the structure. Forming a substantially uniform structure, may cause a more uniform distribution of dislodged electrons throughout the emitter 210. For example, the peaks and ridges of the emitter 210 may be substantially evenly spaced, such that the areas having a higher electric field are substantially evenly distributed throughout the emitter 210. The even distribution of the areas having a higher electric field may result in a substantially even distribution of dislodged electrons and residual gamma-rays, X-rays, etc.

In other embodiments, an additive manufacturing process may facilitate forming the emitter 210 with a specific material distribution. For example, the emitter 210 may be formed from multiple materials with a material have a greater potential to release electrons positioned on an emitting side of the emitter 210 and a material having a greater potential to release greater amounts of energy in the form of incident radiation for the dislodged electrons positioned closer to the radiation source. Thus, as the radiation from the radiation source passes through the emitter 210, the radiation may first encounter a material where the electrons that are dislodged result in high amounts of incident radiation (e.g., Beta particles, X-rays, Compton scattering gamma-rays, etc.) that pass through the rest of the emitter 210. The remaining radiation and the incident radiation may then pass into the material having a greater potential to release electrons. The remaining radiation as well as the incident radiation may release a large number of electrons near emitting surfaces of the emitter 210 that may then pass through the vacuum gap 302 to be collected on the collector 212. In other embodiments, the emitter 210 may be formed from multiple materials having different levels of atomic numbers. For example, the emitter 210 may be formed to have a gradient through the thickness of the emitter 210 from a high Z (high atomic number) material, such as tungsten proximate the radiation source to a low Z (low atomic number) material, such as aluminum proximate the emitting side of the emitter 210.

Figure 5:
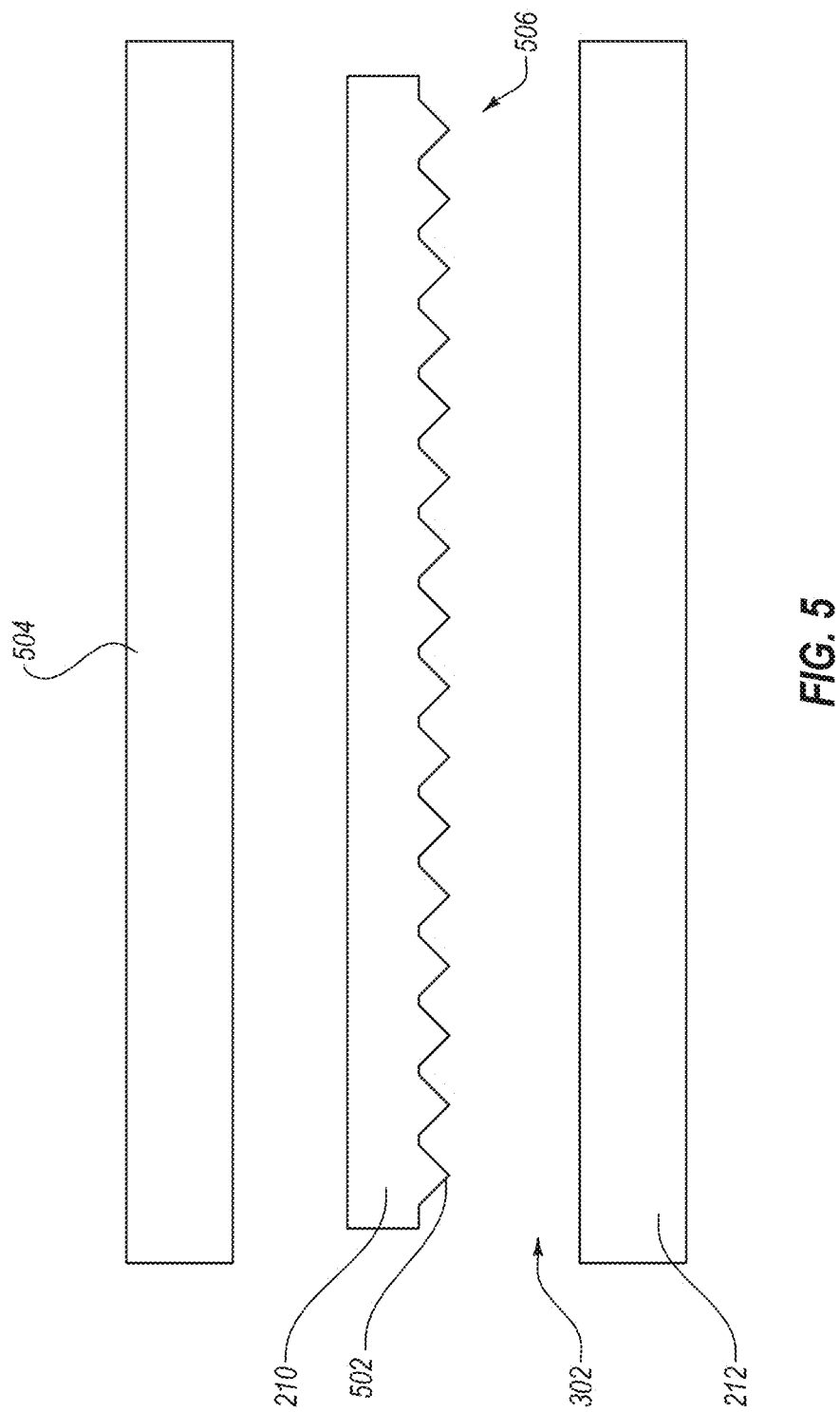
FIGS. 5 and 6 illustrate diagrammatic views of an emitter collector arrangement in accordance with embodiments of the disclosure.
Figure 6:
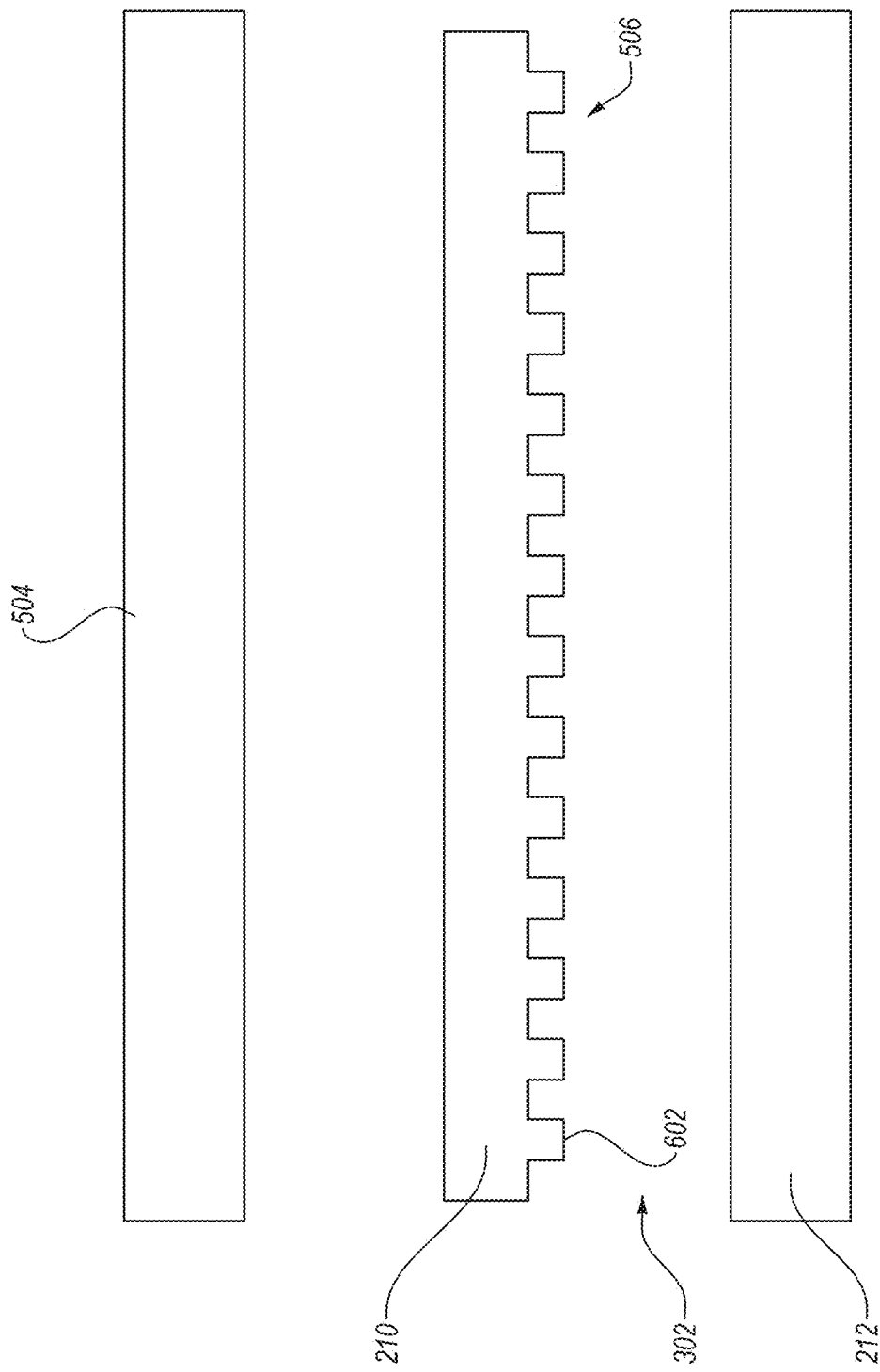

In some embodiments, the emitter 210 may be formed as a solid structure with an emitting surface including peaks or ridges to create areas having a higher electric field as illustrated in FIGS. 5 and 6. Referring first to FIG. 5, the emitter 210 includes an emitting surface 506. The emitting surface 506 may be the surface facing the collector 212. As illustrated in FIG. 3, the layers 304 outside of the radioisotope layers 208 may have a collector 212 on both sides of the emitter 210. Thus, in some embodiments, both sides of the emitter 210 have emitting surfaces 506. A radiation source 504 may be positioned on an opposite side of the emitter 210 from the emitting surface 506, such that radiation leaving the radiation source 504 passes through the emitter 210 before reaching the emitting surface 506. As radiation from the radiation source 504 passes through the emitter 210, the radiation may dislodge electrons resulting in excited electrons, residual gamma rays, X-rays, beta particles and other radiation released from the dislodgment of the electrons as well as the radiation from the radiation source 504 that is not absorbed through the interactions within the emitter 210. The radiation passing through the emitter 210 may then reach the higher energy areas of the peaks 502 on the emitting surface 506. This may result in the dislodgment of additional electrons. As described above, the higher energy areas may release a greater proportion of electrons due to the energy concentrations at the peaks 502. The dislodged electrons may then pass through the vacuum gap 302 between the emitting surface 506 of the emitter 210 and the collector 212 where the dislodged electrons may be collected as described above.

As illustrated in FIG. 5, the peaks 502 may be triangular shapes, such as conical shapes, pyramidal shapes, prismatic shapes, etc. In some embodiments, the peaks 502 may be ridges extending along a length of the emitting surface 506 of the emitter 210. For example, the ridges may be substantially straight vertical or lateral ridges. In other cases, the ridges may extend at an angle relative to the vertical or horizontal axis of the emitter 210, such that the ridges form a spiral or helix on the emitting surface 506 of the ring-shaped emitter 210. In other embodiments, the peaks 502 may be multiple raised points, such as cones or pyramids. For example, the peak 502 may represent an array of raised points.

FIG. 6 illustrates another embodiment of an emitter 210. As illustrated in FIG. 6, the emitter 210 includes peaks 602, which may be raised features. For example, the peaks 602 may have a substantially flat upper surface, rather than a pointed upper surface as illustrated in the embodiment of FIG. 5. As described above, the peaks 602 may form ridges extending in vertical, lateral, and/or angled orientations about the emitting surface 506 of the emitter 210. For example, the peaks 602 may be ridges having a substantially rectangular cross-section. In other embodiments, the peaks 602 may be an array of raised geometric shapes, such as cubes, rectangular prisms, triangular prisms, hexagonal prisms, etc.

The peaks 502, 602 on the emitting surface 506 may be formed through an additive manufacturing process, such as 3-D printing. For example, the emitter 210 may be formed through the additive manufacturing process along with the peaks 502, 602. In other embodiments, the peaks 502, 602 may be formed on a substantially planar surface, such as through a material addition process, such as additive manufacturing, welding, etc., or a material removal process, such as machining.

Accordingly, embodiments of the disclosure may include a method of forming an emitter of a nuclear battery. The method may include forming a ring from a high-density material through an additive manufacturing process. The method may further include forming an outer surface on the ring including multiple peaks extending from the outer surface.

Further embodiments of the disclosure may include a power generation device including a radiation source, an emitter, and a collector. The emitter may be formed around the radiation source. The emitter may include multiple peaks extending from an emitting surface of the emitter. The collector may substantially surround the radiation source and the emitter, such that the emitting surface of the emitter faces the collector. A vacuum gap may be defined between the emitter and the collector.

As described above, reducing the thickness of the emitters 210 and collectors 212 may improve an efficiency of the associated power generation system 200 by reducing thermal loading in the emitters 210 and collectors 212 and thereby reducing the amount of energy lost to generating heat within the emitters 210 and collectors 212. For example, the emitters 210 may have thicknesses in a range from about 10 mm to about 0.5 mm, such as from about 5 mm to about 1 mm or about 2 mm. The collectors 212 may have thicknesses of in a range from about 10 mm to about 0.5 mm, such as from about 5 mm to about 0.5 mm or about 1 mm. As the thickness of the emitters 210 and collectors 212 are reduced the strength and stiffness of the respective emitters 210 and collectors 212 may be reduced. The reduction in strength and/or stiffness may reduce the ability of the associated power generation system 200 to absorb impacts, jolts, bumps, etc., which may occur during transportation of the power generation system 200.

Figure 7:
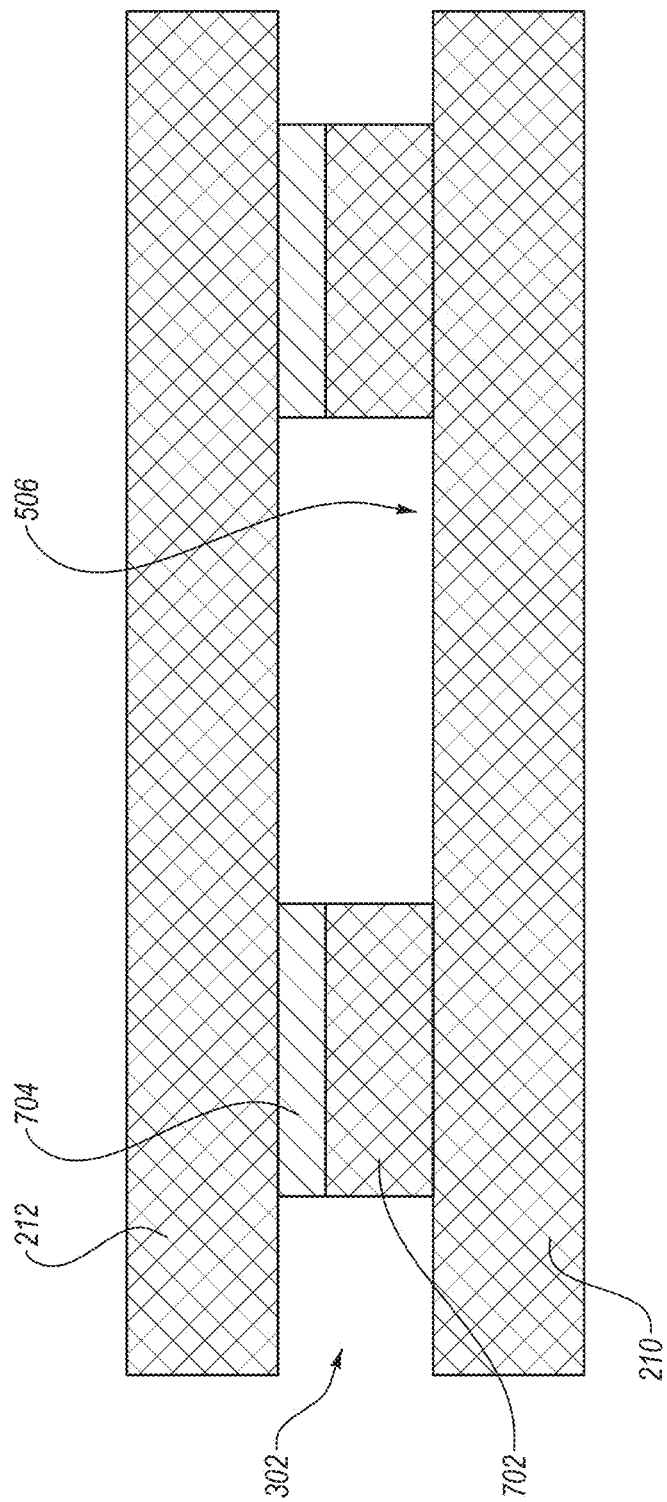
FIG. 7 illustrates a diagrammatic view of an emitter collector interface in accordance with an embodiment of the disclosure.

FIG. 7 illustrates a support structure between an emitter 210 and a collector 212. The emitter 210 may include multiple spacers 702 extending from the emitting surface 506 of the emitter 210. The spacers 702 may extend a greater distance from the emitting surface 506 of the emitter 210 than the peaks 502, 602 described above. An insulator 704 may be formed over the spacers 702 to isolate the emitter 210 from the collector 212. For example, the insulator 704 may be formed over the spacer 702 on a side proximate the collector 212 as illustrated in FIG. 7. In other embodiments, the insulator 704 is formed over both sides (e.g., on the side proximate the emitter 210 and the side proximate the collector 212) of the spacer 702. In some embodiments, the spacer 702 is formed entirely from an insulating material, such that the spacer 702 may also act as the insulator 704. Thus, the emitter 210 does not directly contact the collector 212. The dislodged electrons from the emitter 210 may pass through the vacuum gap 302 and/or the insulator 704 to settle on the collector 212.

The spacers 702 may define a substantially uniform vacuum gap 302 between the emitter 210 and the collector 212. The spacers 702 may include ridges (e.g., helical ridges, straight ridges, vertical ridges, horizontal ridges, etc.), contact points, contact pads, etc. The spacers 702 may provide support to the emitter 210 and the collector 212 and may increase a stiffness of the emitter 210 and the collector 212. The support and increased stiffness of the emitter 210 and the collector 212 may increase a robustness of the resulting power generation system 200, such that the power generation system 200 may be transported with minimal damage to the collectors 212 and emitters 210 within the power generation system 200. Improving the robustness of the power generation system 200 may increase the applications for the power generation system 200, such as allowing for use in more hazardous environments and/or allowing for a variety of types of transportation that may involve larger forces, accelerations, shocks, etc. Furthermore, positioning the spacers 702 between the emitter 210 and the collector 212 may facilitate positioning the emitter 210 and the collector 212 closer together, which may increase the amount of electrons that may be transferred across the vacuum gap 302. Furthermore, positioning the emitters 210 and the collectors 212 closer together may increase a density of the power generation system 200, which may reduce a size of the power generation system 200.

Embodiments of the disclosure may provide methods for tailoring density of the components to the energy bands within the power generation system. The surface profile of the components of the power generation system may also be controlled, which may increase the emission of electrons and therefore the power generated by the power generation system. Providing supports between the components of the power generation system may improve the density of the packing that may be achieved which may increase the efficiency and power production of the system in a smaller package.

Embodiments of the disclosure may increase the efficiency and/or power generation of a nuclear battery type of power generation system. Increasing the efficiency of a nuclear battery may facilitate the creation of smaller nuclear batteries, which may increase the applicability for a nuclear battery. The long life and relative simplicity of a nuclear battery may facilitate their use in remote locations and projects, such as for space exploration and military use. The lack of complex moving parts may enable easy maintenance to be performed without highly specialized technicians. Furthermore, the lack of complex moving parts may allow the nuclear batteries to be transported with fewer risks of damaging critical components.

The embodiments of the disclosure described above and illustrated in the accompanying drawing figures do not limit the scope of the invention, since these embodiments are merely examples of embodiments of the invention, which is defined by the accompanying claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. A power generation device comprising:
a radiation source;
an emitter adjacent to the radiation source, the emitter including a high-density material;
a collector adjacent to the emitter, the collector including a low-density material, the emitter positioned between the radiation source and the collector; and
a spacer extending between the emitter and the collector, at least a portion of the spacer comprising an insulating structure configured to electrically isolate the emitter from the collector.

2. The power generation device of claim 1, wherein the emitter comprises a metal foam material.

3. The power generation device of claim 1, wherein the emitter comprises a distribution of multiple emitting materials.

4. The power generation device of claim 1, wherein the emitter comprises at least one material selected from the group consisting of tungsten, tantalum, uranium, rhenium, gold, and alloys thereof.

5. The power generation device of claim 1, wherein the emitter comprises peaks of the high-density material extending from emitting surfaces of the emitter, wherein the emitting surfaces of the emitter face the collector.

6. The power generation device of claim 5, wherein the peaks of the high-density material comprise ridges along the emitting surfaces of the emitter.

7. The power generation device of claim 5, wherein the peaks of the high-density material comprise an array of raised points extending from the emitting surfaces of the emitter.

8. The power generation device of claim 5, wherein the emitting surfaces comprise an inner surface of the emitter facing the radiation source and an outer surface of the emitter facing away from the radiation source.

9. An emitter of a nuclear battery comprising:
a high-density material having an inner surface and an outer surface,
at least one of the inner surface and the outer surface comprising a roughened surface including multiple peaks configured to create high-energy areas.

10. The emitter of claim 9, wherein the emitter is formed from at least two high-density materials distributed between the inner surface and the outer surface.

11. The emitter of claim 10, wherein a first high-density material forms an inner portion of the emitter including the inner surface and a second high-density material forms an outer portion of the emitter including the outer surface.

12. The emitter of claim 11, wherein the first high-density material comprises a material formulated to release high amounts of energy when electrons are dislodged due to impinging radiation and the second high-density material comprises a material formulated to release large numbers of electrons under the impinging radiation.

13. The emitter of claim 9, wherein the high-density material has an annular shape.

14. The emitter of claim 9, wherein the emitter exhibits a gradient from a high atomic number material to a low atomic number material between the inner surface and the outer surface.

15. The emitter of claim 14, wherein the high atomic number material comprises tungsten.

16. The emitter of claim 14, wherein the low atomic number material comprises titanium.

17. A method of forming an emitter of a nuclear battery, the method comprising:
    forming a ring from a high-density material through an additive manufacturing process; and
    forming multiple peaks extending from a surface of the ring.

18. The method of claim 17, wherein forming the multiple peaks comprises forming ridges along the surface.

19. The method of claim 17, wherein forming the multiple peaks comprises forming an array of raised points about the surface.

* * * * *